United States Patent
Neuhauser et al.

(10) Patent No.: US 6,438,581 B1
(45) Date of Patent: Aug. 20, 2002

(54) METHOD FOR REDUCING DATA RATE DURING TRANSMISSION OF OBJECT-RELATED DATA BETWEEN TWO COMPUTER ELEMENTS COMMUNICATING WITHIN TIME LIMITS

(75) Inventors: Johann Neuhauser, Bruckmuehl; Diedrich Hartung; Florian Graessel, both of Munich; Ronald Hansen, Ottobrunn, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/462,930

(22) PCT Filed: May 17, 1999

(86) PCT No.: PCT/DE99/01474

§ 371 (c)(1), (2), (4) Date: Jan. 18, 2000

(87) PCT Pub. No.: WO99/60490

PCT Pub. Date: Nov. 25, 1999

(30) Foreign Application Priority Data

May 18, 1998 (DE) .......................................... 198 22 211

(51) Int. Cl.⁷ .............................................. G06T 17/00
(52) U.S. Cl. ...................... 709/205; 345/473; 345/619; 709/207; 709/232
(58) Field of Search ................................ 345/473, 474, 345/475, 619; 375/240.12; 709/230, 232, 201, 204, 205, 207

(56) References Cited

U.S. PATENT DOCUMENTS

| 4,855,822 | A | | 8/1989 | Narendra et al. |
| 5,689,161 | A | * | 11/1997 | Fugere et al. ................ 318/563 |
| 5,793,382 | A | * | 8/1998 | Yerazunis et al. ........... 345/474 |
| 5,886,276 | A | * | 3/1999 | Levine et al. .................. 84/603 |
| 6,307,567 | B1 | * | 10/2001 | Cohen-Or .................... 345/619 |

FOREIGN PATENT DOCUMENTS

| DE | 33 30 399 A1 | 8/1983 |
| EP | 0 404 381 A2 | 12/1990 |
| JP | 10-108151 | 4/1998 |
| WO | WO 98/12687 | 3/1998 |

* cited by examiner

Primary Examiner—Meng-Al T. An
Assistant Examiner—Wen-Tai Lin
(74) Attorney, Agent, or Firm—Crowell & Moring LLP

(57) ABSTRACT

A process for reducing required data throughput when transmitting object or process oriented data between user areas communicating within time conditions, uses a data transmission device having at least one communication module to which at least one external unit is assigned. A sending communication module extrapolates the data to be sent and sends the data to a receiving communication module when a comparison value formed of the respective current data and the extrapolated data at least reaches a desired quantity. The receiving communication module extrapolates received data and provides it for use by an external unit until current data are received.

12 Claims, 2 Drawing Sheets

METHOD FOR REDUCING DATA RATE DURING TRANSMISSION OF OBJECT-RELATED DATA BETWEEN TWO COMPUTER ELEMENTS COMMUNICATING WITHIN TIME LIMITS

BACKGROUND AND SUMMARY OF THE INVENTION

The invention relates to a method and apparatus for reducing data throughput when transmitting data which characterize processes or objects, between computing elements communicating under time control, particularly in real time.

In computer units which communicate with one another in real time, the maximum bandwidths or transmission rates of the data transmission devices, including the protocol used for such communication, represent a bottleneck in the data interchange between the computer units. Usually, data quantities which exceed the maximum bandwidth are deleted or delayed during the transmission; and the sending computer has no information concerning the cutting-off or the delay of data quantities, including the portion of the data which has not been transmitted. As the result, the sending computer unit itself has no control over which data the receiving computer unit has received. It is therefore a disadvantage in the state of the art that it is essentially only possible either to tolerate this uncertainty or to accept additional management expenditures with respect to data transmission reliability in order to control the data transmitted to the receiving computer unit. According to the state of the art, these advantages are overcome by using relatively high-expenditure (and therefore high-cost) data transmission devices with a large transmission bandwidth.

It is therefore an object of the invention to provide a process and apparatus for transmitting data between computer units communicating under time control, which minimizes the data quantities to be exchanged between the computer units, while simultaneously preserving the information concerning the respective connected computer units, which is present in the interchanging computer units.

This and other objects and advantages are achieved by the communication method and apparatus according to the invention, in which, during each transmission interval, a sending communication computer decides whether to send updated (current) data to another communication computer in a different user area, using at least one extrapolation process which is running on both data-interchanging communication computers. In the sending communication computer, the current data, generated by external units assigned to the sending communication computer are compared with corresponding data extrapolated by the sending computer. Since the same extrapolated data are also generated in the same manner in the receiving communication computer for use in the external units assigned to it, the sending communication computer, taking into account the transmission path, has information concerning the data which are present in the receiving user area. On this basis, and as a result of the comparison of extrapolated data with current data, the sending communication computer decides whether to send current data to the receiving user area.

In order to design the extrapolation processes efficiently, the characteristics of objects or processes which are described by the data to be transmitted, are structured in corresponding formats such that, on the one hand, the objects or processes are described by as few data expenditures as possible and, on the other hand, the extrapolation processes achieve maximum efficiency in use of computing time. As a result, the data quantities to be transmitted per time unit are significantly reduced. Furthermore, the quality of the objects processed by the system or the number of described objects can be increased, while transmitting the same data quantities as in the state of the art.

The comparison (difference) values as between the current and extrapolated data sets are compared with threshold values for the decision concerning transmission. Together with a continuously updated list of priorities (by means of which a sequence, and thus a transmission point in time of the data to be transmitted is defined), these threshold values determine a maximal transmission error.

The system for transmission of data according to the invention particularly also has the advantage that, for communication between computer systems producing large quantities of data, it is possible to use data transmission devices with relatively low transmission bandwidths, which are reasonable in cost.

Other objects, advantages and novel features of the present invention will become apparent from the following detailed description of the invention when considered in conjunction with the accompanying drawings.

DETAILED DESCRIPTION OF THE DRAWINGS

Figure 1:
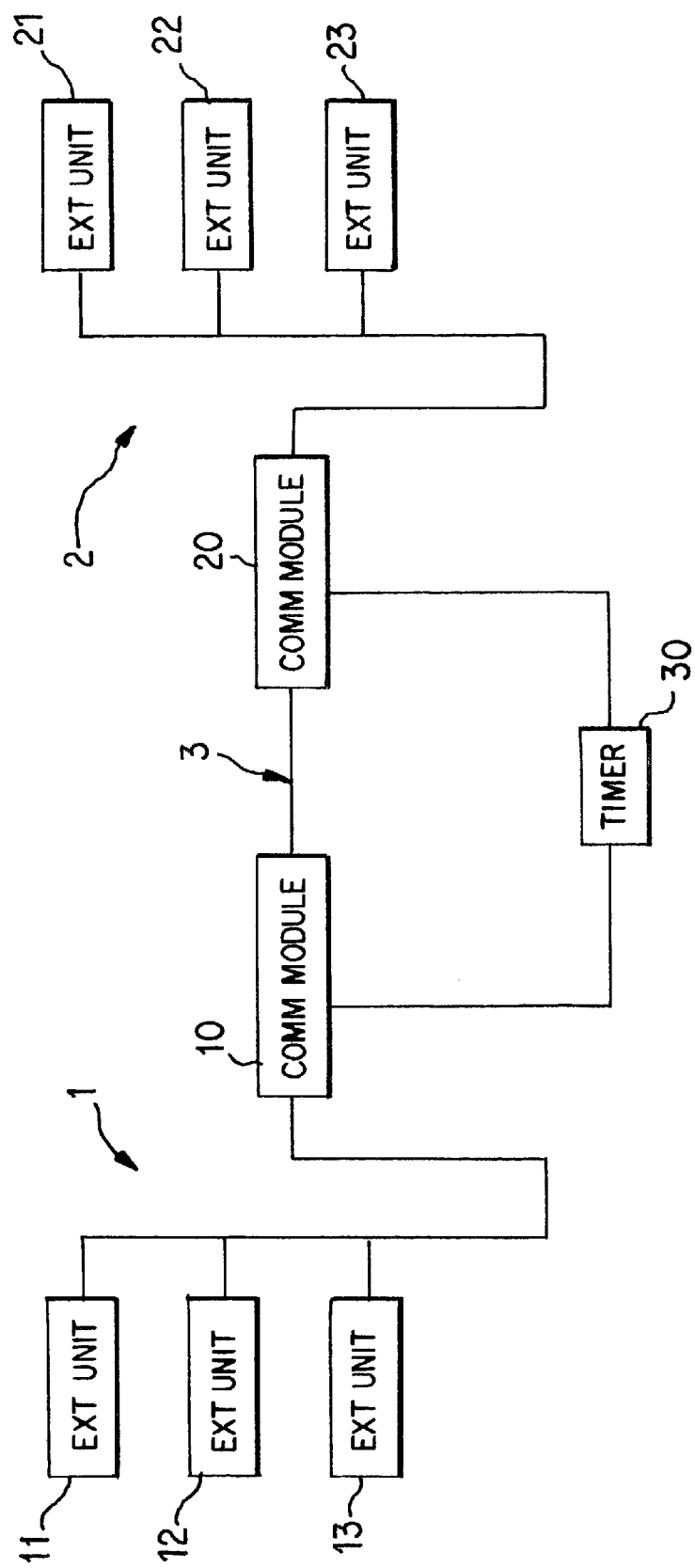
FIG. 1 is a view of the computer system according to the invention with two user areas and a data transmission line.

FIG. 1 illustrates a computer system with a first user area 1 and a second user area 2, which are connected with one another by way of a data transmission device 3, which may also comprise storage media. In the first user area 1, a communication module or a communication computer 10 is connected to the data transmission device 3. The communication computer 10 is connected by way of corresponding signal or data transmission lines with external units 11, 12, 13, which may be computer units or a tape recorder. Likewise, a communication module or communication computer 20 connected to the data transmission device 3 is provided in the second user area 2. This communication computer 20 is also connected by way of corresponding signal or data transmission lines with external units 21, 22, 23 of the second user area 2. The external units 11, 12, 13 and 21, 22, 23 continuously provide data, which may be generated independently of the communications computers 10, 20, and which they transmit to the other communication computers 10, 20. The communication computers 10, 20 communicate with one another under time conditions; that is, they mutually exchange data which they received from the respective assigned external units 11, 12, 13 and 21, 22, 23. The communication computers 10, 20 are connected with a timer 30, and may have functions which control at least parts of the communication between external units.

If, for example, the communication computer 10 receives data from the external units 11, 12, 13 connected with it, which are to be transmitted to the communication computer 20 by way of the data transmission device 3, these data are transmitted by way of the data transmission device 3, using a defined data transmission protocol, in the form of data sets or data set packets of a defined transmission format. The data transmission device 3 has a limited bandwidth, which may be determined, for example, by the maximum data throughput of the transmission channel, such as a data line or a radio connection, by the memory size of an assigned storage unit, or by the data processing speed of the data processing devices provided for data transmission (for example, of a crypter). The generated and interchanged data preferably are object-oriented data; that is, data which describe objects or characteristics of objects.

According to the invention, in the case of the transmission formats, a distinction is made between data which can be changed by way of the transmission steps, and data which cannot (quasi-static data). These may be numerical values as well as logic values. The quasi-static data comprise, for example, data which describe the characteristics of objects which remain the same over time, while the data which can be changed by way of the transmission steps describe, for example, the time-variable behavior of these objects. The quasi-static data need be transmitted only at the beginning of the whole transmission process and at the relatively rare points in time at which they change. A device or function is therefore provided in the respective sending communication computers 10, 20, which determines when a type of quasi-static data has changed, and provides the transmission of corresponding quasi-static data. Furthermore, the respective sending communication computer 10, 20 can initiate and cause the transmission of quasi-static data if this communication computer 10, 20 has determined that a sufficient amount of transmission bandwidth is still available for the corresponding transmission step in the data transmission device 3.

The changeable data are described in application-specific or object-specific formats for the data sets. For the data to be transmitted, extrapolation processes exist in the interchanging communication computers 10, 20, which may represent an estimate of the functions implemented in the assigned external units, or an extrapolation of new values with respect to time on the basis of old values. Analogous to the functions provided in the external units, these extrapolation processes may be mathematical or logic functions, such as data bank functions. By means of the extrapolation processes, data corresponding to those which are present in a communication computer 10, 20 at the time of a transmission step may be determined for a later point in time. The extrapolation processes provided in a communication computer 10, 20 may depend on the number and type of the functions which are implemented in the assigned external units 11, 12, 13 and 21, 22, 23. However, they may also be designed independently of the functions of the external units 11, 12, 13 and 21, 22, 23 according to general principles. In each case, the extrapolation processes implemented in a communication computer of a user area perform the function (in parallel to the generation of current data) of calculating values for the external units in the receiving user area, on the basis of specific functions in the external units of the sending user area. The extrapolations in the receiving user area thus determine values or data for points in time for which the respective current data are determined, on the basis of specific functions in the external units of the sending user area.

In determining the time value on which the extrapolation is based, the transmission time of the data from the sending communication computer 10 to the receiving communication computer 20 is taken into account. In the case of the sending communication computer, for example, a transmission time is used which is determined in advance. In the case of the receiving communication computer 20, the transmission time for a particular data set is determined by a time stamp provided by the sending communication computer 10 based on a signal of the timer 30 corresponding to the sending point in time, and the absolute time defined by the timer 30 for the receiving point in time. This actual transmission time is preferably transmitted in turn to the communication computer which has sent the data, and is used later to estimate the transmission time by the sending communication computer. The extrapolation processes are optimized or adapted to the data or to the corresponding data set formats of the application or their objects and vice-versa, with respect to the computing time. For the respective operating time of the computer system according to the invention, the extrapolation processes are constantly active in the corresponding communication computers 10, 20. In the sending communication computer, the same extrapolation process is active which runs in the receiving communication computer, and is used for generating the same data, and therefore information on the basis of which the operation takes place in the respective receiving user area. The current data sent to the receiving communication computer or the data extrapolated there are preferably used as input data for the functions which are implemented in the external units of the respective receiving user area.

For example, the communication computer 10 in each case sends current data of the corresponding specific data set format (that is, a group of data types by means of which the objects to be described by the data can be efficiently described) to the receiving communication computer 20. These current data are generated by the external units which are assigned to the sending communication computer and which perform specific application programs or functions, preferably for (among other things) time-variable description of objects. Such current data are generally required at least partially by the functions which run on external units in the respective receiving user area. Then, independently of one another the sending communication computer 10 and the receiving communication computer 20 use the same specific extrapolation processes which are applied to data with the same time basis defined by the timer 30, to determine data for a later point in time (for example, for a later transmission step). The data extrapolated by the receiving communication computer 20 and the data it receives from time to time are used as input quantities for the object-oriented functions which run in the external units of the receiving user area. Independently thereof, the sending communication computer 10 receives from the external units 11, 12, 13 assigned to it (on which the function or object-oriented application programs run) additional current data which, for a particular subsequent point in time, correspond to the respective data which were or are obtained by the corresponding extrapolation.

The current data are compared in the communication computer 10 with the extrapolated data. In parallel thereto, the application programs or functions, which run in the receiving user area, operate on the basis of the data last generated by the sending user area or communication computer 10 and transmitted to the receiving communication computer 20 or on the basis of the data obtained by the receiving communication computer 20 by extrapolation. If, during the comparison in the sending communication computer 10, the resulting comparison values exceed a threshold value (at which the transmission time determined by the sending communication computer 10 and which is determined for each object described by the respective data set or an object related thereto specifically before or during the operation of the computer system), a transmission of the data set formed of these data is initiated. (That is, its transmission is noted down.) On the basis of the transmission time concretely determined by means of the timer 30, the receiving communication computer 20 relates the respective received current data to the point in time at which they were generated in the sending user area or its external units or to which they relate. By taking into account the transmission path, the sending communication computer 10 can compare the current data with the data used in the application programs of the external units 21, 22, 23 in the receiving user area 2, and on the basis of such comparison, can also obtain information concerning the precision with which the functions of the external units 21, 22, 12 are running.

For the decision as to which data are actually sent by the sending communication computer 10 to the receiving communication computer 20, a list of priorities is provided which is constantly updated by the sending communication computer 10. This list of priorities represents an evaluation of a variable number of entries which refer to the data sets to be sent. In this case, the data and the contents themselves are preferably not entered into the list of priorities, the entries including only references to the respective data sets. By means of the list of priorities (which is to be updated constantly), it is determined that the data to which the entries refer in each case are sent to the receiving communication computer 20, which is performed in the order or sequence in which the entries are listed in the list of priorities.

The order or sequence, and thus the significance, of the entries and of the pertaining data sets in the list of priorities required with respect to the operational reliability, is determined by given criteria. For this determination, for example, the following are relevant: for which time period the data of a certain type were no longer updated by the communication computer 20 or were sent irrespective of an updating; which meaning and significance attributed with respect to the functionality of the whole computer system is assigned to the data sets pertaining to the entries; and the size of the data sets. In the order or sequence of the entries of the priority list, the data sets to which the respective entries refer are sent by the sending communication computer 10 to the receiving communication computer 20.

From the sum of the entries listed in the list of priorities, the sending communication computer 10 determines the transmission bandwidth which is required to ensure the operational reliability of the entire computer system. If the required transmission bandwidth exceeds the bandwidth defined by the data transmission device 30, the sending communication computer 10 can take appropriate countermeasures. These may include the following: Increase of the physical bandwidth of the data transmission device 30, for example, by connecting another transmission line, or a temporary reduction of the bandwidth required for the functionality of the entire computer system by a temporary change of the criteria for the determination of the list of priorities, for example, by a raising of the tolerance limit defined by the threshold values.

The function of the data transmission was described above for a case in which the communication computer 10 is the sending unit and the communication computer 20 is the receiving unit. This operation can simultaneously also take place in the reverse direction. In addition, the described sequences can also be used when data are to be sent for the description of different objects in one or the other direction.

The computer system according to the invention may also have more than two user areas. In this case, one or several user area(s) may comprise one or several communication computer(s). In addition, only one communication computer may be provided for several user areas. Also, one or several additional communication computer(s) may be connected to a first communication computer, which additional communication computer(s) may also be subordinate to the first communication computer.

The timer 30 has the function of indicating to the communication computers connected to it an absolute time; that is, a time which is independent of the sequence in the communicating computers. This function can be carried out by means of other devices available in the state of the art, for example, by standard time clocks.

By separating data into static and dynamic data, the data set to be sent frequently contains only the highly time-variable or dynamic data, so that the data set size is smaller than the data set sent in the state of the art with each transmission step and provided with the same contents. As a result, the data quantity to be transmitted is reduced.

In an alternative embodiment, several objects may also be described by means of one data set.

As an alternative to the described embodiments, the extrapolation processes in the communication modules 10, 20 or computers may differ. However, they must be suitable for building up and having available within the respective communication module 10, 20 a knowledge of the information present in the respective assigned communication module 10, 20.

The transmission times for the transmission of the data from the sending to the receiving communication computer or module 10, 20 estimated or determined during the extrapolation in the preferred embodiment may also be omitted if permitted by the required overall precision of the system according to the invention.

In the receiving communication module, an estimated transmission time can also be used when defining the extrapolation time.

Another advantage of the invention is that it generates data sets which are specific to the simulated objects. These data sets contain data by means of which a particularly efficient extrapolation can be carried out with a minimal number of data, so that a further reduction of the transmission bandwidth requirements is achieved.

By establishing a constantly updated list of priorities and controlling the utilization of the transmission system, its bandwidth can be optimally utilized by selection of the data sets to be transmitted. The priority list can be updated at predetermined time intervals or automatically according to known processes.

In the following, the invention will be described by means of the simulation system illustrated in FIG. 2.

Figure 2:
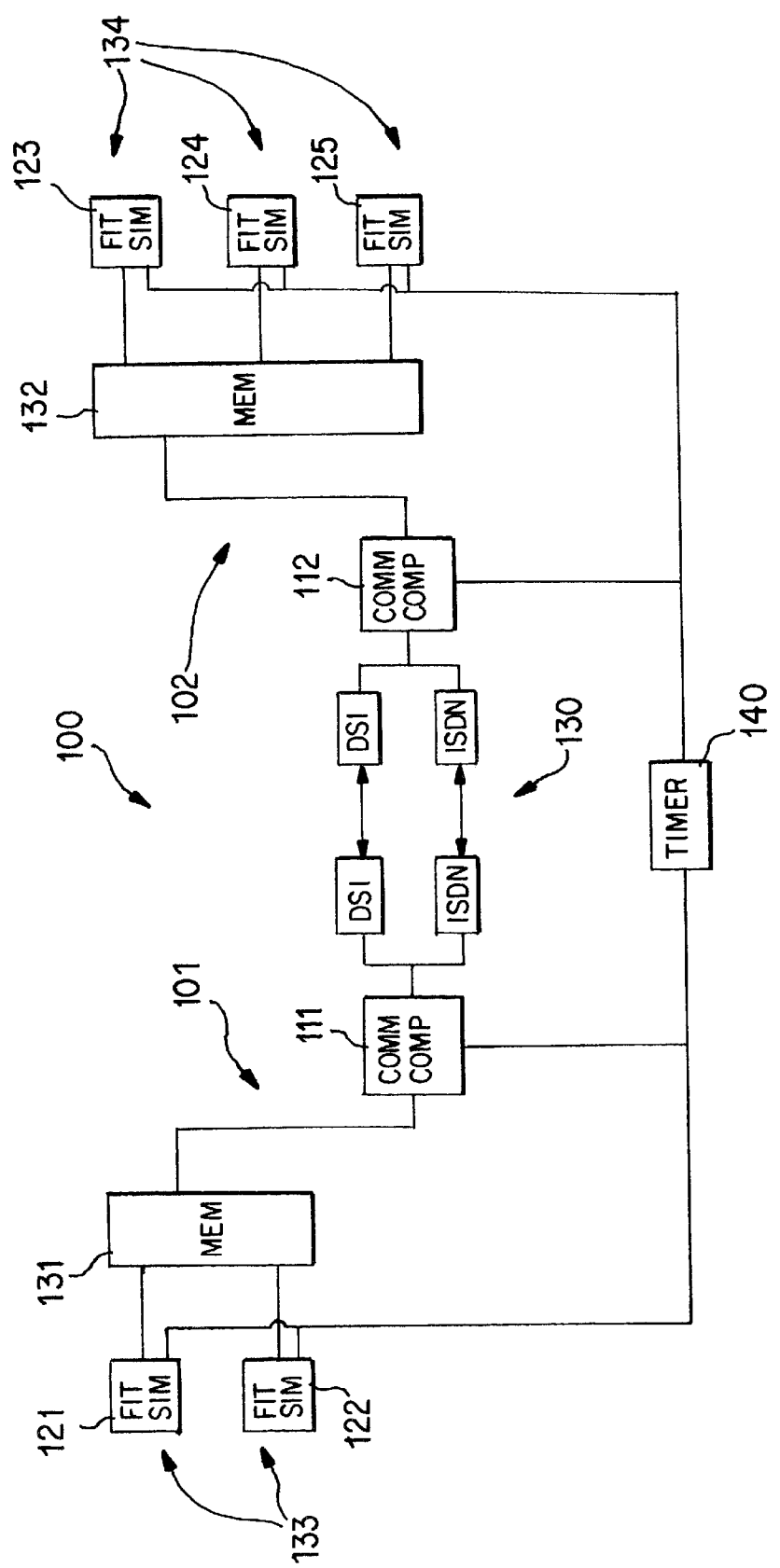
FIG. 2 is a view of a simulation system also with two user areas as an application example of the invention.

FIG. 2 illustrates a simulation system 100 in which several locally mutually separated flight simulators operate in a predetermined air space, for example, in groups, with or against one another. FIG. 2 shows a first simulation center 101 and a second simulation center 102. The two simulation centers 101, 102 each have a communication module or a communication computer 111, 112, to which several simulation devices 133, 134 are connected by means of the corresponding interfaces (I/F). In the first simulation center 101, a first flight simulator 121 and a second flight simulator 122 (each of which may be for example, an airplane simulation, a weapons system simulation, a cockpit simulation, an outside-view simulation or others are connected to the simulation devices 133 assigned to these interfaces. Two airplane simulators 123, 124 are also connected as simulation devices to the communication computer 112 of the second simulation center 102. One shared memory 131, 132 provided in each of the two simulation centers 101, 102 is connected with the communication computer 111, 112 and with the pertaining flight simulators 121, 122 and 123, 124, 125. Data interchange among the simulation devices 133 and 134 as well as between the simulation devices 113 and the assigned communication computer 111 is carried out by way of the shared memory 131, 132. Between the first simulation center 101 and the second simulation center 102, a data transmission device or a transmission system 130 transmits data from one communication computer to another via a transmission medium.

The communication computers 111, 112 are connected with a timer 140.

In the following, the method of operation of the simulation system according to FIG. 2 is described:

The two simulation centers 101 and 102 operate in real time and may be situated at locations far remote from one another. As a result, for example, by means of the simulation system 100, tactical air combat maneuvers of two hostile groups of flight simulators can be carried out in a predetermined scenario, with the respective flight-related or tactical decisions made in each simulation center 101, 102 independently of one another.

The flight simulators 121, 122 and 123, 124, 125 normally continuously (or at a defined updating or iteration rate) supply to the shared memory 131, 132 data (changing by way of iteration steps) concerning their condition and the values calculated by their functions. Thus, the flight simulation supplies, for example, information concerning the momentary position, velocity, acceleration, angular velocities, angular accelerations of the airplane model as well as concerning its attitude and direction. At the updating rate, the flight simulators 121, 122, 123, 124 also supply data to their assigned communication computers 111, 112 concerning the condition of the respective plane which is flown by means of the corresponding cockpit device in a simulation.

Furthermore, the flight simulators 121, 122 and 123, 124, 125 supply quasi-static data concerning the airplane type, possibly its subtypes, status, affiliation with a formation as well as flight-technical and tactical parameters.

The weapons system simulation sends quasi-static data of guided missiles, for example, with respect to the type, possible subtypes, status, such as the flight condition or achieved hits, affiliation with a formation or with a selected target. As dynamic data, on the one hand, guided-missile-specific data are sent to the shared memory 131, 132, specifically preferably the position and speed of the missile. On the other hand, the weapons system simulation sends emission data, for example, radar data or interference data (jammers) and simulation data for defense measures to the respective shared memories 131, 132.

The communication computers have access to the data of the flight simulators 121, 122 and 123, 124, 125 via the shared memories 131, 132. Those data which are relevant, for example, to the cockpit simulations of the flight simulators 123, 124, 125 of the second simulation center 102 with respect to the first simulation center 101 are sent by the first communication computer 111 to the second communication computer 112. For a further illustration of the method of operation, in the following, the communication computer 111 will be considered to be the sending communication computer.

The receiving communication computer 112 receives the quasi-static and dynamic data sent by the communication computer 111 and uses application-specific extrapolation algorithms to extrapolate these dynamic data to defined later points in time, until it receives a new data set from the communication computer 111. During this extrapolation, the time duration of a possible transmission of the data to simulation devices 134 of another simulation center 102 is taken into account. The communication computer 112 provides the quasi-static data by way of the shared memory 132 to the flight simulators 123, 124, 125.

Both communication computers 111, 112, which are part of the assigned simulation centers 101, 102, implement the same specific extrapolation algorithms and use them to extrapolate in parallel data for later points in time, based on the sent and received data, taking into account the transmission time for the respective transmission between the simulation computers. The sending communication computer 111 compares the data obtained by extrapolation with the current data generated by the assigned flight simulators 121, 122 and data present in the shared memory 131. If this comparison results in differential values which are larger than predetermined threshold values, the communication computer 111 initiates the transmission of the current data of the flight simulators 121, 122 by way of the data transmission system 130 to the communication computer 112. These current transmitted data form the new starting point for a new extrapolation.

The actual transmission takes place on the basis of the list of priorities described in connection with FIG. 1. These are continuously updated in the operation by the communication computer 111, in which entries with references to corresponding data sets on the basis of concrete criteria, which may also change in the course of the process, are arranged in a priority sequence corresponding to the transmission sequence.

In the present application, the positions of the corresponding entries of the flight simulators 121, 122 in the list of priorities are defined according to: i) the amount by which the differential values between the current and the extrapolated data have exceeded a predetermined threshold value; ii) the importance of the current data; and/or iii) a possibly defined minimal updating rate. The importance of data is determined, for example, on the basis of the required computing precision of the functions of the flight simulators 121, 122. For example, airplanes within the range of a gun are assigned a higher precision and thus a higher importance than those objects which cannot yet be detected by radar. Airplane data which are generated by the airplane simulation may also have a greater importance than missile data because a higher precision is normally required for the description of the flight path of an airplane.

In order to control and direct the quantity of the data sent by the communication computer 111 by way of the transmission system 130, the threshold values for the comparison between the extrapolated and the updated data can be modified by the respective communication computer 111. For this purpose, for example, for missiles, a lower and an upper limit of threshold values with respect to the position vector and the speed vector are used as initialization parameters.

The data sent to the communication computer 112 are transmitted in the form of defined data sets, which depends on the function of the flight simulators 121, 122 which these data sets generate (for example, the flight simulation or the weapons system simulation). For example, the following data sets are provided in the described application: a data set with the above-mentioned quasi-static data in each case for a simulated airplane and in each case for a missile which is generated and sent at least once in the course of the life cycle of the corresponding object; a data set with the dynamic data for one airplane simulation respectively which is to be sent as a function of the predetermined threshold values and which preferably comprises the position, the speed, the acceleration, the orientation (in quaternions), the angular velocity and the angular acceleration; a data set with the dynamic data for one missile respectively controlled by the weapons system simulation, which preferably contains its position and speed; a data set with data, for example, for objects, such as radar emissions, jammer simulations of defense measures, these data being transmitted in the form of the corresponding data set either always as soon as they were generated or being sent in a fixed time pattern.

When the data sets of the quasi-static dynamic or other data are sent, these data sets are provided with an identification of the generating flight simulator 121, 122. In addition, the data sets of the dynamic data receive a time stamp.

By the use of quaternions to describe the orientation of simulated objects, a particularly efficient extrapolation of these data can be carried out. This permits, on the one hand, a data reduction while simultaneously maintaining predetermined error tolerance limits. On the other hand, during the transmission of the same data quantity as transmitted without the process according to the invention (that is, according to the state of the art), a better quality of the values is achieved because of the values transmitted by the application programs within the respective system.

It is important to note that the structures of the data sets are designed specifically for the description of the simulated objects and simultaneously permit an efficient extrapolation (that is, an extrapolation by means of relatively few data). As a result, in the event of a corresponding deviation of the extrapolated data from the current data, only a few data need be transmitted to the receiving simulation center.

An above-described data set packet is sent per transmission step to the second communication computer 112. The transmission of all interchanged data need not take place in a timed manner in the case of the process according to the invention. A transmission step in this case is only a single transmission step. In order to take into account the transmission time (which occurs only in a simulation system but not in reality), the data to be sent are precomputed to the receiving point in time. In this case, the transmission time which is used was determined in the preceding transmission steps by means of the timer 140 (based on the time stamp added to the respective data set when sending it off and the absolute times transmitted by the timer to the corresponding communication computers).

The above statements refer to the method of operation of the simulation system for the transmission from the communication computer 111 to the communication computer 112. Analogously, they also apply to the reverse transmission operation.

In an alternative embodiment of the air space simulation system 100, each simulation center 101, 102 may comprise more than two communication computers 111, 112. The air space simulation system 100 according to the invention may also comprise more than two simulation centers which each have at least one communication computer 111, 112.

The relationship of functions described by means of the first communication computer 101 is preferably also implemented in the second communication computer 112 as well as optionally in the additional communication computers.

The system according to the invention can, for example, also be provided for the alignment of simulations with the corresponding real systems, instruments or vehicles, in which case the same time base must always be used for the measurement data to be fed into the system to be aligned as well as for the measurement data to be fed into the simulated system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for reducing a required data throughput in transmission of at least partially time variable information which characterizes an object or process, by means of a protocol between communication modules which communicate with one another under time control by way of a data transmission device, each communication module being coupled to at least one external unit for providing and utilizing transmitted data, and each communication module being connected with a timer, said process comprising:

a sending communication module in a sending user area performs a first time-related extrapolation of data to be sent, using a predetermined algorithm and taking into account a transmission time, said data to be sent comprising current actual data provided by an external unit coupled to said sending communications module;

said sending communication module compares said current actual data currently provided by said external unit with temporally corresponding extrapolated data, and determines a comparison value based thereon;

said sending communication module transmits said current actual data to a receiving communication module in a receiving user area when said comparison value reaches or exceeds a desired quantity;

said receiving communication module, performs a second time-related extrapolation of data received from the sending communication module, said second time related extrapolation corresponding to said first time-related extrapolation performed by the sending communication module, and using the same predetermined algorithm; and said receiving communication module provides extrapolated data for use by an external unit coupled thereto until the receiving communication module has received further current actual data; wherein in extrapolation of the received data, the receiving communication module takes into account a time delay due to transmission time required for transmission of data from the sending to the receiving communication module;

the extrapolation is specific for at least one time-variable object or process characterized by the data;

the data are defined in the form of data sets which reflect characteristics of the object or process to be characterized, which characteristics can be extrapolated;

the desired quantity used for the comparison between the current actual and the extrapolated data can be set during the process, based on a data quantity to be sent for a particular point in time relative to an available data transmission bandwidth;

for defining a sequence in which data are sent in the form of data sets, a continuously updated list of priorities is provided which comprises an arrangement of references to data sets; and the sequence is determined by a weighting the significance of respective data sets in terms of functionality of the external unit at least of the sending user area, and by a time duration within which a particular data set has no longer been sent until updating of the list of priorities.

2. The process according to claim 1, wherein:

the sending communication module formats data to be sent, into a data set with data which are invariable for a relatively long time, and a data set with data which are variable in the course of a small number of iteration steps;

the data set with the invariable data are sent according to time intervals which are several times larger than time intervals according to which the variable data are sent; and the data set with the variable data are used for extrapolation.

3. The process according to claim 1, wherein the first and second extrapolations are mathematical extrapolations.

4. The process according to claim 1, wherein the comparison value is a differential value and the desired quantity is a threshold value.

5. The process according to claim 1 wherein said receiving communications module performs said time-related extrapolation independently of the time-related extrapolation performed in said sending communications module.

6. An apparatus for transmitting at least partially time variable transmission data which characterize an object or process, comprising:

a plurality of communication modules, each of which is coupled to send and receive transmission data to and from other communication modules via a transmission medium in a time controlled manner, and each of which is adapted to interchange transmitted and received transmission data with at least one external unit associated therewith, which external unit generates and provides to the associated communication module transmission data actual which characterize an object or process, and uses transmission data received from said associated communication module;

wherein each of said communication modules includes means for extrapolating actual data forward in time using a predetermined algorithm, taking into account a transmission time for transmission of data;

comparing current actual data currently provided by an external unit associated therewith in a sending user area, with extrapolated data corresponding thereto and determining a comparison value based thereon;

transmitting said current actual data to a receiving communication module in a receiving user area when said comparison value reaches or exceeds a desired quantity;

performing a time extrapolation of transmission data received from a sending communication module which sent such data, in parallel to the extrapolation performed by the sending communication module and using the same predetermined algorithm; and said receiving communication module providing extrapolated data for use by an external unit coupled thereto until the receiving communication module has received further current actual data; wherein in extrapolation of the received data, the receiving communication module takes into account a time delay due to transmission time required for transmission of data from the sending to the receiving communication module;

the extrapolation is specific for at least one time-variable object or process characterized by the data;

the data are defined in the form of data sets which reflect characteristics of the object or process to be characterized, which characteristics can be extrapolated;

the desired quantity used for the comparison between the current actual data and the extrapolated data can be set during the process, based on a data quantity to be sent for a particular point in time relative to an available data transmission bandwidth;

for defining a sequence in which data are sent in the form of data sets, a continuously updated list of priorities is provided which comprises an arrangement of references to data sets; and the sequence is determined by a weighting the significance of respective data sets in terms of functionality of the external unit at least of the sending user area, and by a time duration within which a particular data set has no longer been sent until updating of the list of priorities.

7. The apparatus according to claims 6, wherein:

the sending communication module formats data to be sent, into a data set with data which are invariable for a relatively long time, and a data set with data which are variable in the course of a small number of iteration steps;

the data set with the invariable data are sent according to time intervals which are several times larger than time intervals according to which the variable data are sent; and the data set with the variable data are used for extrapolation.

8. The apparatus according to claim 6, wherein the first and second extrapolations are mathematical extrapolations.

9. The apparatus according to claim 6, wherein the comparison value is a differential value and the desired quantity is a threshold value.

10. The apparatus according to claim 6, wherein said external units comprise simulator devices for simulating an object or process.

11. The apparatus according to claim 6 wherein said receiving communications module performs said time-related extrapolation independently of the time-related extrapolation performed in said sending communications module.

12. Method for reducing a required data throughput in the transmission of at least partially time-variable object-related data between respective communications modules, by means of a protocol communicating within time conditions through a data transmission device, each of which modules is associated with at least one external unit for providing or using the object-related data, and each of which modules is connected with a timer, wherein:

a first time extrapolation of data which are to be transmitted is performed in a sending communication module according to a predetermined extrapolation method, taking into consideration a transmission time for transmission of data from the sending communications module to a receiving communications module;

data are transmitted to a respective receiving communications module when a comparative value formed from current data and the extrapolated data reaches or exceeds a set value;

a second time extrapolation of transmitted data is performed in the receiving communications module, using said predetermined extrapolation method, in parallel to and independent of the extrapolation performed in the sending communications module, and using an extrapolation time which takes into consideration a time delay due to said transmission time;

an external unit assigned to the receiving communications module uses extrapolated data until the receiving communications module has received new data;

the desired quantity used for the comparison between the current actual and the extrapolated data can be set during the process, based on a data quantity to be sent for a particular point in time relative to an available data transmission bandwidth;

for defining a sequence in which data are sent in the form of data sets, a continuously updated list of priorities is provided which comprises an arrangement of references to data sets; and the sequence is determined by a weighting the significance of respective data sets in terms of functionality of the external unit at least of the sending user area, and by a time duration within which a particular data set has no longer been sent until updating of the list of priorities.

* * * * *